(12) United States Patent
Murata et al.

(10) Patent No.: US 12,249,087 B2
(45) Date of Patent: Mar. 11, 2025

(54) IMAGE PROCESSING DEVICE AND IMAGE PROCESSING METHOD

(71) Applicant: FANUC CORPORATION, Yamanashi (JP)

(72) Inventors: Yuusuke Murata, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 293 days.

(21) Appl. No.: 17/908,082

(22) PCT Filed: Mar. 16, 2021

(86) PCT No.: PCT/JP2021/010613
§ 371 (c)(1),
(2) Date: Aug. 30, 2022

(87) PCT Pub. No.: WO2021/193236
PCT Pub. Date: Sep. 30, 2021

(65) Prior Publication Data
US 2023/0089139 A1    Mar. 23, 2023

(30) Foreign Application Priority Data
Mar. 23, 2020   (JP) .................. 2020-050744

(51) Int. Cl.
*G06T 7/00*        (2017.01)
*G06T 7/50*        (2017.01)
*G06V 20/64*       (2022.01)

(52) U.S. Cl.
CPC .............. *G06T 7/50* (2017.01); *G06V 20/64* (2022.01); *G06T 2200/04* (2013.01); *G06T 2207/10012* (2013.01); *G06T 2207/10028* (2013.01)

(58) Field of Classification Search
CPC .................. G06T 7/50; G06T 2200/04; G06T 2207/10012; G06T 2207/10028;
(Continued)

(56) References Cited

U.S. PATENT DOCUMENTS

2012/0148100 A1* 6/2012 Kotake ..................... G06T 7/75
                                                          382/103
2013/0271577 A1* 10/2013 Watanabe ................. G06T 7/75
                                                          348/46
(Continued)

FOREIGN PATENT DOCUMENTS

CN        101652626 A      2/2010
JP        2000-222585      8/2000
(Continued)

OTHER PUBLICATIONS

International Search Report issued Jun. 1, 2021 in corresponding International Application No. PCT/JP2021/010613.

*Primary Examiner* — Bobbak Safaipour
*Assistant Examiner* — Dylan Joseph Sherrillo
(74) *Attorney, Agent, or Firm* — Wenderoth, Lind & Ponack, L.L.P.

(57) ABSTRACT

The present invention facilitates detection of an object imaged by a three-dimensional sensor. The image processing device includes: a distance calculating unit that, on the basis of three-dimensional data acquired by the three-dimensional sensor, calculates a distance between each of points in the three-dimensional data and a reference plane; a distance image creating unit that creates a distance image having pixel values constituted by values each calculated on the basis of the distance calculated by the distance calculating unit; and an image processing unit that carries out image processing on the distance image. The reference plane may be a bearing surface bearing the object or a surface parallel with the bearing surface. The reference plane may (Continued)

also be a surface of the object. The image processing device may include the three-dimensional sensor.

6 Claims, 5 Drawing Sheets

(58) Field of Classification Search
CPC .............. G06T 7/521; G06T 7/0004; G06T 2207/30164; G06T 15/10; G06V 20/64
See application file for complete search history.

(56) References Cited

U.S. PATENT DOCUMENTS

2017/0116462 A1* 4/2017 Ogasawara ........ G01B 11/2513
2022/0180552 A1* 6/2022 Taniyasu ................ G01B 11/26

FOREIGN PATENT DOCUMENTS

| | | | |
|---|---|---|---|
| JP | 2006-313116 A | | 11/2006 |
| JP | 2007-213353 | | 8/2007 |
| JP | 2011-196860 | | 10/2011 |
| JP | 2015-170907 | | 9/2015 |
| JP | 2016-123079 | | 7/2016 |
| JP | 2018-4281 | | 1/2018 |
| JP | 2018004281 A | * | 1/2018 |
| JP | 2018-107642 | | 7/2018 |
| JP | 2019-219248 | | 12/2019 |
| JP | 7150105 B2 | * | 10/2022 |
| JP | 7439410 B2 | * | 2/2024 |
| WO | 2009/028489 | | 3/2009 |
| WO | 2019/230284 A1 | | 12/2019 |
| WO | 2020/013021 | | 1/2020 |

* cited by examiner

IMAGE PROCESSING DEVICE AND IMAGE PROCESSING METHOD

TECHNICAL FIELD

The present invention relates to an image processing device and an image processing method. More particularly, the present invention relates to an image processing device and an image processing method for performing image processing using three-dimensional data acquired by a three-dimensional sensor.

BACKGROUND ART

Examples of image processing devices for performing image processing using three-dimensional data acquired by a three-dimensional sensor include devices disclosed in Patent Documents 1 and 2.

Patent Document 1 discloses a device that detects a three-dimensional object through two-dimensional image processing. Specifically, the device disclosed in Patent Document 1 captures an image of a three-dimensional object using a pair of imagers and calculates disparity data for each of regions obtained by segmenting the image. The device then generates a grayscale image in which each region has a corresponding grayscale value based on the disparity data and based on the distance from the imagers. The device models the three-dimensional object and calculates correlation values representing the similarity between the resulting model and an image area in the grayscale image. The model is a two-dimensional image having shape features of the three-dimensional object as seen in a direction from the position of the imagers, and each of the regions obtained by segmenting the two-dimensional image has a grayscale value representing the distance between a corresponding part of the three-dimensional object and the imagers. The correlation values are calculated based on the grayscale values of the model and the grayscale values of the image area in the grayscale image. The device then detects the three-dimensional object by detecting, from the grayscale image, an image area having the greatest correlation value with the model.

Patent Document 2 discloses a motion detection device capable of detecting a three-dimensional motion with high accuracy. Specifically, the motion detection device disclosed in Patent Document 2 includes: an image acquisition unit that acquires a distance image; a segmentation unit that segments the distance image acquired by the image acquisition unit into sub-regions having a predetermined size; a first detection unit that detects a motion in a plane direction for each set of similar sub-regions between distance images successively acquired by the image acquisition unit; a calculation unit that calculates depth information for each sub-region; and a second detection unit that detects a motion in a depth direction for each set of similar sub-regions based on the depth information calculated by the calculation unit.

Patent Document 1: Japanese Unexamined Patent Application, Publication No. 2007-213353
Patent Document 2: Japanese Unexamined Patent Application, Publication No. 2000-222585

DISCLOSURE OF THE INVENTION

Problems to be Solved by the Invention

In a case where an object is detected by creating a distance image based on the distance from a three-dimensional sensor to a surface of the object and performing image processing on the distance image, the surface of the object may not be perpendicular to the optical axis of the three-dimensional sensor. If this is the case, the distance from the three-dimensional sensor to the surface that is not perpendicular to the optical axis of the three-dimensional sensor is not constant, making it difficult to detect the object. It is therefore desired to make it easier to detect an object even if the surface of the object is not perpendicular to the optical axis of a three-dimensional sensor.

Means for Solving the Problems (1) An image processing device according to a first aspect of the present disclosure is an image processing device including:
a distance calculation unit configured to calculate, based on three-dimensional data acquired by a three-dimensional sensor, a distance between a reference plane and each of points in the three-dimensional data;
a distance image creation unit configured to create a distance image that has, as pixel values, values calculated based on the distance calculated by the distance calculation unit; and
an image processing unit configured to perform image processing on the distance image.

(2) An image processing method according to a second aspect of the present disclosure is an image processing method for an image processing device, the image processing method including:
calculating, based on three-dimensional data acquired by a three-dimensional sensor, a distance between a reference plane and each of points in the three-dimensional data;
creating a distance image that has, as pixel values, values calculated based on the distance calculated; and
performing image processing on the distance image.

Effects of the Invention

According to the aspects of the present disclosure, it is easy to detect an object even if the object is oblique to the optical axis of the three-dimensional sensor.

PREFERRED MODE FOR CARRYING OUT THE INVENTION

Figure 1:
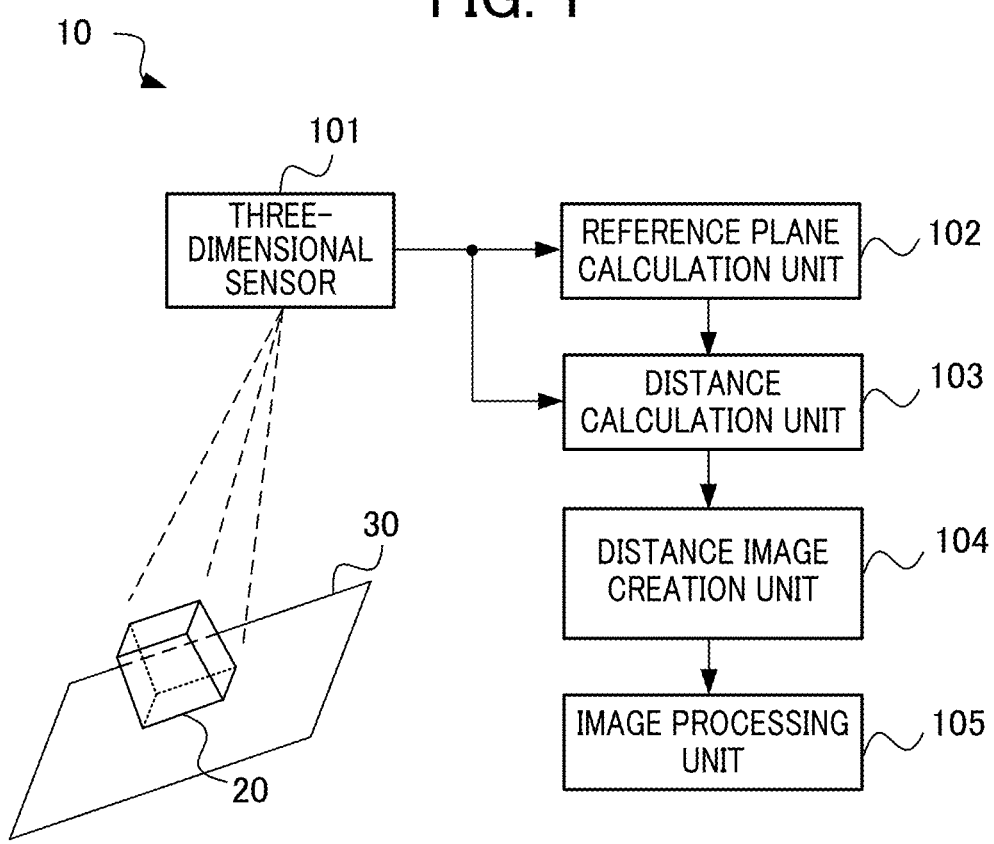
FIG. 1 is a block diagram illustrating a configuration example of an image processing device according to an embodiment of the present invention.

The following describes an embodiment of the present invention in detail with reference to the drawings. FIG. 1 is a block diagram illustrating a configuration example of an image processing device according to an embodiment of the present invention.

As shown in FIG. 1, an image processing device 10 includes a three-dimensional sensor 101, a reference plane calculation unit 102, a distance calculation unit 103, a distance image creation unit 104, and an image processing unit 105. As shown in FIG. 1, the three-dimensional sensor 101 captures an image of a workpiece 20 and a loading surface 30 on which the workpiece 20 is loaded, and outputs resulting three-dimensional data to the reference plane calculation unit 102 and the distance calculation unit 103. The three-dimensional data is a three-dimensional point cloud or a distance image in this example, but is not limited as such. The three-dimensional data may be any other three-dimensional data.

The workpiece 20 is a detection object. The loading surface 30 is, for example, a surface of a table on which the workpiece 20 is loaded. As shown in FIG. 1, the loading surface 30 and the workpiece 20 are disposed obliquely to the optical axis of the three-dimensional sensor 101. The workpiece 20 is trapezoid-shaped in this example.

Examples of three-dimensional sensors usable as the three-dimensional sensor 101 include a stereo camera that measures the distance between the stereo camera and the detection object workpiece 20 by performing matching between images respectively captured by two cameras, and a stereo camera that measures the distance between the stereo camera and the detection object workpiece 20 by performing matching between an image of a pattern projected from a projector and images captured by cameras. Another example of a three-dimensional sensor usable as the three-dimensional sensor 101 is a stereo camera that measures the distance between the stereo camera and the detection object workpiece 20 by performing matching between images respectively captured by two cameras under a condition where a pattern is projected from a projector.

The reference plane calculation unit 102 determines a reference plane for detecting the workpiece 20 based on the three-dimensional data outputted from the three-dimensional sensor 101. Other than being determined by the reference plane calculation unit 102 based on the three-dimensional data outputted by the three-dimensional sensor 101, the reference plane may be, for example, determined using a designed value or through a measurement by another measurement method. The reference plane is a surface that is not parallel to the three-dimensional sensor 101. For example, the reference plane is the loading surface 30 or a surface parallel to the loading surface 30. The surface parallel to the loading surface 30 includes a contact surface of the workpiece 20 that is in contact with the loading surface 30. In the example described below, the loading surface 30 is used as the reference plane.

Figure 2:
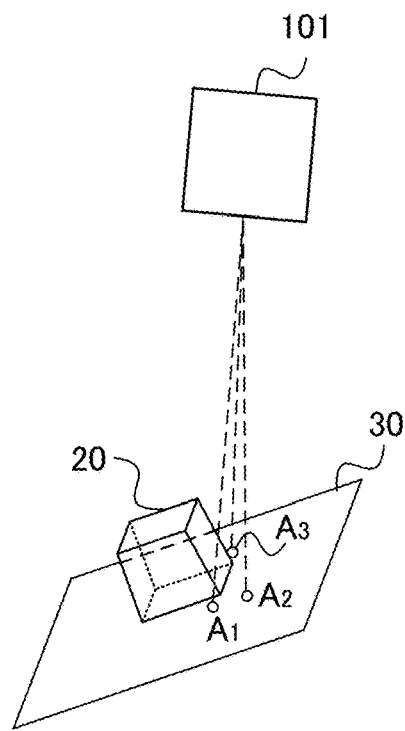
FIG. 2 is a diagram illustrating a method by which a three-dimensional sensor included in the image processing device detects a loading surface on which a workpiece is loaded.

FIG. 2 is a diagram illustrating a method by which the three-dimensional sensor included in the image processing device detects the loading surface on which the workpiece 20 is loaded. The reference plane calculation unit 102 determines, based on the three-dimensional data outputted by the three-dimensional sensor 101, three-dimensional coordinates of the three-dimensional sensor 101 and at least three points on the loading surface 30, such as three points $A_1$, $A_2$, and $A_3$ on the loading surface 30 shown in FIG. 2, in a three-dimensional coordinate system of the three-dimensional sensor 101. The reference plane calculation unit 102 can determine the three points $A_1$, $A_2$, and $A_3$ on the loading surface 30 by detecting a portion of the loading surface 30 around the workpiece 20. The reference plane calculation unit 102 can determine an equation representing the loading surface 30 in the three-dimensional coordinate system of the three-dimensional sensor 101 (hereinafter, referred to as a "three-dimensional coordinate system") based on the three-dimensional coordinate values of the three points $A_1$, $A_2$, and $A_3$ on the loading surface 30 shown in FIG. 2. The equation representing the loading surface 30 may be denoted as $aX+bY+cZ+d=0$. Hereinafter, coordinates on respective axes in the three-dimensional coordinate system are referred to as "three-dimensional coordinates".

The distance calculation unit 103 can calculate the distance between the loading surface 30 (reference plane) and each of points on a surface of the workpiece 20 based on the equation representing the loading surface 30 determined by the reference plane calculation unit 102, and the three-dimensional coordinates of the points on the surface of the workpiece 20 and the loading surface 30 determined based on the three-dimensional data outputted from the three-dimensional sensor 101. Specifically, the distance from three-dimensional coordinates $(X_0, Y_0, Z_0)$ of a point on a surface of the workpiece 20 that faces the three-dimensional sensor 101 to the loading surface 30 represented by $aX+bY+cZ+d=0$ is represented by an expression 1 (Expression 1 below).

$$|aX_0+bY_0+cZ_0+d|/\sqrt{(a^2+b^2+c^2)} \qquad \text{[Expression 1]}$$

Figure 3:
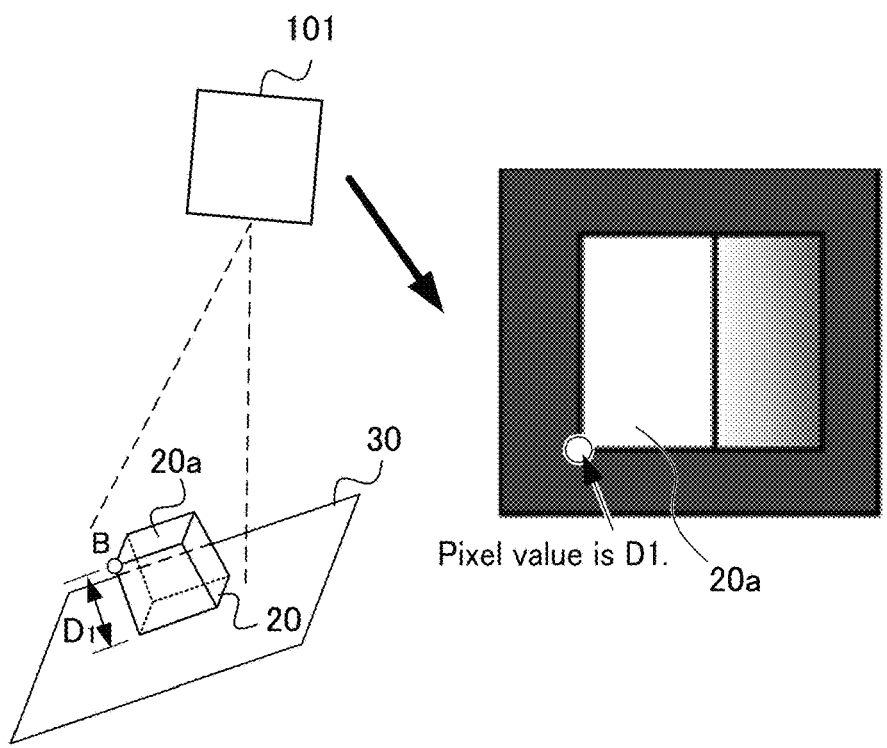
FIG. 3 is a diagram illustrating an arrangement of the three-dimensional sensor and the workpiece, and an image obtained by converting a distance image so that distances from the loading surface each represent a luminance.

According to this method, for example, the distance between the loading surface 30 and a surface 20a of the workpiece 20 is a constant distance $D_1$ as shown in FIG. 3.

The distance image creation unit 104 creates a distance image that has, as pixel values, values calculated based on the calculated distance between the loading surface 30 and each of the points on the surface of the workpiece 20. FIG. 3 shows a case where a pixel value of a point B at a corner of the surface 20a of workpiece 20 is D1. The distance image herein means an image created by measuring a surface of an object and capturing an image thereof, and giving each pixel on the captured image a value, as a pixel value, calculated based on the calculated distance between the loading surface 30 and a corresponding one of points on the surface of the workpiece 20.

Figure 4:
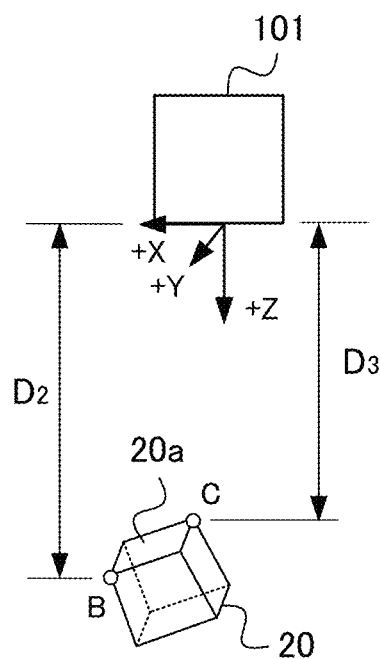
FIG. 4 is a diagram illustrating a case where a distance image is created using, as pixel values thereof, values calculated based on the distance between the three-dimensional sensor and each of points on a surface of the workpiece.

The image processing unit 105 performs image processing on the distance image. For example, the image processing unit 105 converts the distance image to an image in which the values (pixel values) calculated based on the distance between the loading surface 30 and each of the points on the surface of the workpiece 20 each represent a luminance, which in other words is an image in which the pixel values are exhibited as gradations. The image in which the pixel values are exhibited as gradations is, for example, a single chromatic color image or a grayscale image. In the image in which the pixel values are exhibited as gradations resulting from the conversion of the distance image, the luminance of the surface 20a of the workpiece 20 is constant within this surface as shown in FIG. 3, because the distance from the loading surface 30 to the surface 20a of the workpiece 20 is the constant distance $D_1$. FIG. 3 shows a case where the image in which the pixel values are exhibited as gradations is a grayscale image. The luminance of the surface 20a of the workpiece 20 being constant within this surface makes it easier to detect the workpiece 20. According to the present embodiment, as shown in FIG. 3, the luminance is the highest on the surface 20a of the workpiece 20, which is at the longest distance from the loading surface 30 (farthest from the loading surface 30), and the luminance decreases with the decreasing distance from the loading surface 30 (toward the loading surface 30). For comparison, a case will be described using FIG. 4 where a distance image is created using, as pixel values thereof, values calculated based on the distance between the three-dimensional sensor 101 and each of points on a surface of the workpiece 20. As shown in FIG. 4, a distance De between the point B at the corner of the surface 20a of the workpiece 20 and the three-dimensional sensor 101 is different from a distance $D_3$ between a point C at a corner of the surface 20a of the workpiece 20 and the three-dimensional sensor 101 in the Z direction of the three-dimensional coordinate system (X, Y, Z) of the three-dimensional sensor 101. Consequently, the luminance of the surface 20a of the workpiece 20 is not constant within this surface in the case of a grayscale image obtained by converting a distance image created using, as pixel values thereof, values calculated based on the distance between the surface 20a of the workpiece 20 and the three-dimensional sensor 101. The image processing unit 105 may further perform image processing on the converted image such as the grayscale image in which the pixel values are exhibited as gradations, for displaying the image on a display device such as a liquid crystal display device.

In order to implement the functional blocks included in the image processing device 10 shown in FIG. 1, except for the three-dimensional sensor 101, the image processing device 10 may include a computer having an arithmetic processor such as a central processing unit (CPU). The image processing device 10 further includes an auxiliary storage device such as a hard disk drive (HDD) storing various control programs like application software and an operating system (OS), and a main storage device such as random access memory (RAM) for storing data transitorily needed when the arithmetic processor executes the programs.

Accordingly, in the image processing device 10, the arithmetic processor reads the application software and the OS from the auxiliary storage device, and performs computing based on the application software and the OS while deploying the read application software and the read OS to the main storage device. Furthermore, various types of hardware included in the image processing device 10 are controlled based on the results of the computing. Through the above, the functional blocks according to the present embodiment are implemented. That is, the present embodiment can be implemented through cooperation of hardware and software.

Figure 5:
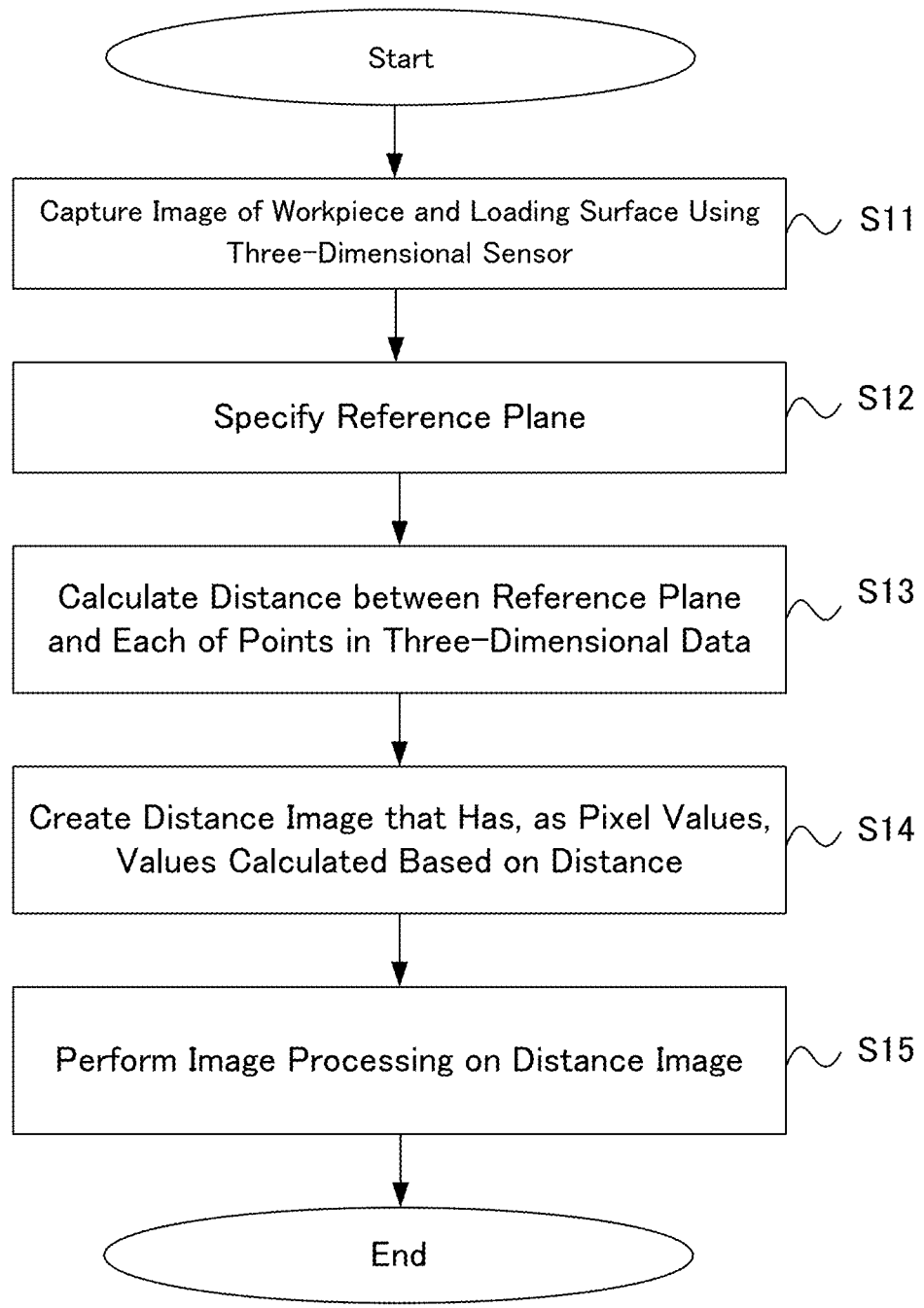
FIG. 5 is a flowchart showing operation of an image processing unit according to the embodiment.

The following describes operation of the image processing device 10 with reference to FIG. 5. At Step S11, the three-dimensional sensor 101 captures an image of the workpiece 20 and the loading surface 30 on which the workpiece 20 is loaded, and outputs resulting three-dimensional data to the reference plane calculation unit 102 and the distance calculation unit 103.

At Step S12, the reference plane calculation unit 102 determines, based on the three-dimensional data, three-dimensional coordinates of at least three points on the loading surface 30, such as the three points $A_1$, $A_2$, and $A_3$ on the loading surface 30 shown in FIG. 3. The reference plane calculation unit 102 then determines an equation representing the loading surface 30 in the coordinate system of the three-dimensional sensor 101 based on the three-dimensional coordinates of the three-dimensional sensor 101 and the three points $A_1$, $A_2$, and $A_3$ on the loading surface 30 shown in FIG. 2. The equation representing the loading surface 30 may be denoted as $aX+bY+cZ+d=0$. The reference plane calculation unit 102 outputs, to the distance calculation unit 103, the thus determined equation ($aX+bY+cZ+d=0$) representing the loading surface 30.

At Step S13, the distance calculation unit 103 calculates the distance between the loading surface 30 (reference plane) and each of points on a surface of the workpiece 20 based on the equation representing the loading surface 30 determined by the reference plane calculation unit 102, and the three-dimensional coordinates of the points on the surface of the workpiece 20 and the loading surface 30 determined based on the three-dimensional data outputted from the three-dimensional sensor 101. Specifically, the distance from three-dimensional coordinates $(X_0, Y_0, Z_0)$ of a point on a surface of the workpiece 20 that faces the three-dimensional sensor 101 to the loading surface 30 represented by $aX+bY+cZ+d=0$ is represented by the aforementioned expression 1 (Expression 1 below).

At Step S14, the distance image creation unit 104 creates a distance image that has, as pixel values, values calculated based on the calculated distance between the loading surface 30 and each of the points on the surface of the workpiece 20.

At Step S15, the image processing unit 105 performs image processing on the distance image. For example, as described above, the image processing unit 105 converts the distance image to a grayscale image in which the values calculated based on the distance between the loading surface 30 and each of the points on the surface of the workpiece 20 each represent a luminance. In the grayscale image resulting from the conversion, the luminance of the surface 20a of the workpiece 20 is constant within this surface as shown in FIG. 3, because the distance from the loading surface 30 to the surface 20a of the workpiece 20 is the constant distance $D_1$.

According to the present embodiment described above, the workpiece loading surface to be used as the reference plane is specified, a distance image is created that has, as pixel values, values calculated based on the distance between the specified loading surface and each of points on a surface of the workpiece, and image processing is performed on the distance image, so that a distance image in squarely confronting relationship to the workpiece can be obtained even if the workpiece is oblique to the optical axis of the sensor. This configuration makes it easier to detect the workpiece.

The image processing device according to the present embodiment can be, for example, used for detection of a workpiece on a table in a machine tool or detection of a workpiece on a table in a configuration in which the workpiece is conveyed by a robot arm.

<Example in which Surface Other than Loading Surface is Used as Reference Plane>

In the embodiment described above, the loading surface on which a workpiece is loaded or a surface parallel to the loading surface is used as the reference plane. However, a surface other than the loading surface and a surface parallel to the loading surface may be used as the reference plane. The following describes an example in which a surface other than the loading surface and a surface parallel to the loading surface is used as the reference plane. In the example described below, the workpiece is hexagonal prism-shaped.

Figure 6:
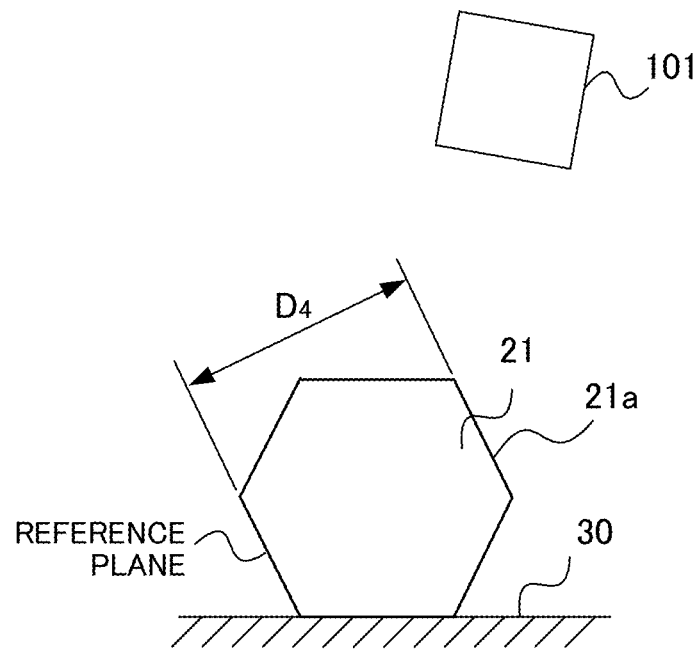
FIG. 6 is a diagram illustrating the three-dimensional sensor included in the image processing device and a hexagonal prism-shaped workpiece loaded on the loading surface.

FIG. 6 is a diagram illustrating the three-dimensional sensor included in the image processing device and a hexagonal prism-shaped workpiece loaded on the loading surface. As shown in FIG. 6, a side surface oblique to the loading surface 30 is specified as the reference plane out of a hexagonal prism-shaped workpiece 21, and it is impossible for the three-dimensional sensor 101 to capture an image of the reference plane. In order to determine an equation representing the side surface of the hexagonal prism-shaped workpiece 21 to be used as the reference plane, an additional three-dimensional sensor having the same configuration as the three-dimensional sensor 101 is disposed in a position where the side surface of the hexagonal prism-shaped workpiece 21 can be observed. As a result of the additional three-dimensional sensor being provided, the reference plane calculation unit 102 can determine an equation representing the side surface of the workpiece 21 in a coordinate system of the additional three-dimensional sensor. The reference plane calculation unit 102 performs a calibration on the coordinate system of the three-dimensional sensor 101 and the coordinate system of the additional three-dimensional sensor, and then determines the equation representing the side surface of the workpiece 21 in the coordinate system of the additional three-dimensional sensor. Based on the thus determined equation representing the side surface, the reference plane calculation unit 102 can determine an equation representing the side surface of the workpiece 21 in the coordinate system of the three-dimensional sensor 101.

The distance calculation unit 103 calculates the distance between the side surface (reference plane) of the workpiece 21 and each of points on a different surface of the workpiece 21 based on the equation representing the side surface of the workpiece 21 determined by the reference plane calculation unit 102, and the three-dimensional coordinates of the points on the different surface of the workpiece 21 and the loading surface 30 determined based on the three-dimensional data outputted from the three-dimensional sensor 101, in the same manner as in the example described above in which the loading surface is used as the reference plane except that the equation representing the side surface of the workpiece 21 is used instead of the equation representing the loading surface 30. As shown in FIG. 6, the distance from the reference plane to a surface 21a of the workpiece 21 is a constant distance $D_4$.

The distance image creation unit 104 creates a distance image that has, as pixel values, values calculated based on the distance between the side surface of the workpiece 21 and each of the points on the different surface of the workpiece 21 calculated based on the three-dimensional data outputted from the three-dimensional sensor 101. The image processing unit 105 converts the distance image to, for example, a grayscale image. In the resulting image, the luminance of the surface 21a of the workpiece 21 is constant within this surface, because the distance from the reference plane to the surface 21a of the workpiece 21 is the constant distance $D_4$. The luminance of the surface 21a of the workpiece 21 being constant within this surface makes it easier to detect the workpiece 21.

Through the above, an embodiment of the present invention has been described. Constituent elements of the image processing unit according to the embodiment described above can be implemented by hardware, software, or a combination thereof. For example, the constituent elements may be implemented by an electronic circuit. An image processing method that is carried out through cooperation of the aforementioned constituent elements can also be implemented by hardware, software, or a combination thereof. Being implemented by software herein means being implemented through a computer reading and executing a program.

The program can be supplied to the computer by being stored on any of various types of non-transitory computer readable media. The non-transitory computer readable media include various types of tangible storage media. Examples of the non-transitory computer readable media include magnetic storage media (such as hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and random access memory (RAM)).

The embodiment described above is a preferred embodiment of the present invention. However, the scope of the present invention is not limited solely to the embodiment described above. The embodiment may be modified in a variety of ways to practice the present invention without departing from the gist of the present invention.

For example, in the embodiment described above, a workpiece, which is a piece of material to be machined in a machine tool, is taken as an example of the object. However, the object is not limited to a workpiece, and may be anything other than a workpiece. For example, the object may be a manufactured article, a commodity, or a packaging material such as a cardboard box containing a manufactured article or a commodity.

In a case where the loading surface 30 is predetermined to be used as the reference plane, a reference plane storage unit that stores the equation representing the loading surface 30 or the side surface of the workpiece 21 may be provided instead of the reference plane calculation unit 102. Upon receiving a distance image indicating the distance between the three-dimensional sensor 101 and the workpiece 20 from the three-dimensional sensor 101, the distance calculation unit 103 may read the equation representing the loading surface 30 or the side surface of the workpiece 21 from the reference plane storage unit, and convert the received image to a distance image that has, as pixel values, values of the distance from the loading surface 30 or the side surface of the workpiece 21.

The three-dimensional sensor 101 does not need to be provided inside the image processing device 10, and may be provided outside the image processing device 10. Furthermore, the workpiece is not limited to being trapezoid-shaped or hexagonal prism-shaped, and may have another shape such as a cube shape or a rectangular prism shape.

The image processing device and the image processing method according to the present disclosure can take various embodiments having the following configurations including the embodiment described above.

(1) A first aspect of the present disclosure is directed to an image processing device including:
a distance calculation unit configured to calculate, based on three-dimensional data acquired by a three-dimensional sensor, a distance between a reference plane and each of points in the three-dimensional data;
a distance image creation unit configured to create a distance image that has, as pixel values, values calculated based on the distance calculated by the distance calculation unit; and
an image processing unit configured to perform image processing on the distance image.

According to this image processing device, it is easy to detect an object even if the object is oblique to the optical axis of the three-dimensional sensor.

(2) The image processing device described in (1), wherein the three-dimensional data includes three-dimensional data of an object, and
the reference plane is a loading surface on which the object is loaded or a surface parallel to the loading surface.

(3) The image processing device described in (1), wherein the three-dimensional data includes three-dimensional data of an object, and
the reference plane is a surface of the object.

(4) The image processing device described in (2) or (3), wherein the object is a workpiece.

(5) The image processing device described in any one of (1) to (4), including the three-dimensional sensor.

(6) The image processing device described in any one of (1) to (5), further including a reference plane calculation unit configured to determine the reference plane based on the three-dimensional data.

(7) The image processing device described in any one of (1) to (6), wherein the image processing includes processing for converting the distance image to an image in which pixel values are exhibited as gradations.

(8) The image processing device described in (7), wherein the image in which the pixel values are exhibited as gradations is a grayscale image.

(9) A second aspect of the present disclosure is directed to an image processing method for an image processing device, the image processing method including:
calculating, based on three-dimensional data acquired by a three-dimensional sensor, a distance between a reference plane and each of points in the three-dimensional data;
creating a distance image that has, as pixel values, values calculated based on the distance calculated; and
performing image processing on the distance image.

According to this image processing method, it is easy to detect an object even if the object is oblique to the optical axis of the three-dimensional sensor.

EXPLANATION OF REFERENCE NUMERALS

10: Image processing device
20, 21: Workpiece
30: Loading surface
101: Three-dimensional sensor
102: Reference plane calculation unit
103: Distance calculation unit
104: Distance image creation unit
105: Image processing unit

The invention claimed is:

1. An image processing device comprising:
a memory configured to store a program; and
a processor configured to execute the program and control the image processing device to:
calculate a reference plane, based on three-dimensional data around an object on a loading surface of the object acquired by a three-dimensional sensor, the loading surface being inclined from a direction perpendicular to an optical axis of the three-dimensional sensor;
calculate, based on three-dimensional data acquired by the three-dimensional sensor, a distance between the reference plane and each of points in the three-dimensional data;
create a distance image that has, as pixel values, values calculated based on the calculated distance; and
perform image processing on the distance image.

2. The image processing device according to claim 1, wherein the object is a workpiece.

3. The image processing device according to claim 1, comprising the three-dimensional sensor.

4. The image processing device according to claim 1, wherein
the image processing includes processing for converting the distance image to an image in which pixel values are exhibited as gradations.

5. The image processing device according to claim 4, wherein
the image in which the pixel values are exhibited as gradations is a grayscale image.

6. An image processing method for an image processing device which includes a memory configured to store a program and a processor configured to execute the program and control the image processing device, the image processing method comprising:
calculating a reference plane, based on three-dimensional data around an object on a loading surface of the object acquired by a three-dimensional sensor, by the processor, the loading surface being inclined from a direction perpendicular to an optical axis of the three-dimensional sensor;
calculating, based on three-dimensional data acquired by the three-dimensional sensor, a distance between the reference plane and each of points in the three-dimensional data, by the processor;
creating a distance image that has, as pixel values, values calculated based on the calculated distance, by the processor; and
performing image processing on the distance image, by the processor.

* * * * *